United States Patent
Mitchell (10) Patent No.: US 8,117,610 B2
(45) Date of Patent: Feb. 14, 2012

(54) SYSTEM AND METHOD FOR INTEGRATED ARTIFACT MANAGEMENT

(75) Inventor: Ian J. Mitchell, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 12/022,444

(22) Filed: Jan. 30, 2008

(65) Prior Publication Data

US 2009/0193398 A1 Jul. 30, 2009

(51) Int. Cl.
*G06F 9/44* (2006.01)
(52) U.S. Cl. ...................................................... 717/173
(58) Field of Classification Search .................... 717/137
See application file for complete search history.

(56) References Cited

U.S. PATENT DOCUMENTS

| | | | |
|---|---|---|---|
| 7,240,067 B2 | 7/2007 | Timmons | |
| 7,284,235 B2 | 10/2007 | Nachmanson et al. | |
| 7,548,930 B2* | 6/2009 | Kobza et al. | 1/1 |
| 2005/0081189 A1* | 4/2005 | Krasikov et al. | 717/123 |
| 2006/0026251 A1* | 2/2006 | Cheng et al. | 709/207 |
| 2007/0250810 A1* | 10/2007 | Tittizer et al. | 717/110 |
| 2008/0134142 A1* | 6/2008 | Nathan et al. | 717/114 |

* cited by examiner

*Primary Examiner* — Philip Wang
(74) *Attorney, Agent, or Firm* — Schmeiser, Olsen & Watts; Joseph Bracken (57) ABSTRACT

A system and associated method for availing literate programming in a software development environment. An integrated artifact manager processes a retrieval request and a storage request pursuant to a user group associated with respective interface. A developer user uses an integrated development environment interface. A commentator user uses a wiki interface. An integrated artifact has a source code fragment and a design code fragment that is associated with the source code fragment by tag describes the source code fragment. The source code fragment is stored in a source code management system. The design comment fragment is stored in a wiki repository. The developer user modifies both source code fragments and design comment fragments, and the commentator user modifies only design comment fragments.

20 Claims, 8 Drawing Sheets

ONE EMBODIMENT OF INTEGRATED ARTIFACT
600

```
601:    <refstep file="quicksort.c"> A sample literate program
602:    <design> Quicksort is one of basic sorting algorithms that
603:    separates numbers into two parts by a pre-selected pivot and
604:    recursively performs quicksort upon each part of numbers.
605:    </design>
606:    <prog>
607:     !
608:     ! Conventional comments within source codes
609:     !
610:      void quicksort(void * base, size_t num_elements, size_t
611:    element_size,
612:                    int (*comparer)(const void *, const void *))
613:    {
614:        <getref>quicksort declarations
615:        <getref>check termination condition
616:        <getref>select a pivot
617:        <getref>partition the array
618:        <getref>recursively sort each subpartition
619:    }
620:    </prog>
621:    </refstep>
622:
623:    <refstep>quicksort_declarations
624:    <prog>
625:    int pivotIndex;
626:    </prog>
627:    </refstep>
```

SYSTEM AND METHOD FOR INTEGRATED ARTIFACT MANAGEMENT

FIELD OF THE INVENTION

The present invention discloses a system and associated method for improving conventional source code management systems to support literate programming and dynamic documentation in a software development environment.

BACKGROUND OF THE INVENTION

Conventional methods of source code management and/or a conventional version control system are used by a limited number of authorized users who are mostly developers of a large scale software project. On the other hand, with wiki content management, it is easy to gather comments from wide variety of users but the accuracy of content is questionable and the content is vulnerable to vandalism. Either conventional source code management or wiki content management is not suitable for literate programming that supports a literary description of actual source codes for an improved readability.

Thus, there is a need for a system and associated method that overcomes at least one of the preceding disadvantages of current methods and systems for managing content in a program development environment.

SUMMARY OF THE INVENTION

The present invention provides a method for availing literate programming in a software development environment, the method comprising:

processing a retrieval request made by a user to present a first integrated artifact of at least one integrated artifact, wherein the user is a member of a user group consisting of a first group of commentators and a second group of developers, wherein said processing the retrieval request comprises:

retrieving a first source code fragment from a source code storage and retrieving a first design comment fragment associated with the first source code fragment from a design comment storage, wherein the first source code fragment and the first design comment fragment are associated with each other by a first tag of at least one tag;

subsequent to said retrieving, merging the first source code fragment and the first design comment fragment into the first integrated artifact;

subsequent to said merging, presenting the first integrated artifact to the user through an interface associated with the user group of the user; and processing a storage request made by the user to store a second integrated artifact of said at least one integrated artifact, wherein said processing the storage request comprises:

separating the second integrated artifact into a second source code fragment and a second design comment fragment;

subsequent to said separating, identifying the second source code fragment and the second design comment fragment by a second tag of said at least one tag;

subsequent to said identifying, storing fragments from said identifying pursuant to the user group of the user.

The present invention provides a computer program product, comprising a computer usable storage medium having a computer readable program code embodied therein, said computer readable program code containing instructions that when executed by a processor of a computer system implement a method for availing literate programming in a software development environment, the method comprising:

processing a retrieval request made by a user to present a first integrated artifact of at least one integrated artifact, wherein the user is a member of a user group consisting of a first group of commentators and a second group of developers, wherein said processing the retrieval request comprises:

retrieving a first source code fragment from a source code storage and retrieving a first design comment fragment associated with the first source code fragment from a design comment storage, wherein the first source code fragment and the first design comment fragment are associated with each other by a first tag of at least one tag;

subsequent to said retrieving, merging the first source code fragment and the first design comment fragment into the first integrated artifact;

subsequent to said merging, presenting the first integrated artifact to the user through an interface associated with the user group of the user; and processing a storage request made by the user to store a second integrated artifact of said at least one integrated artifact, wherein said processing the storage request comprises:

separating the second integrated artifact into a second source code fragment and a second design comment fragment;

subsequent to said separating, identifying the second source code fragment and the second design comment fragment by a second tag of said at least one tag;

subsequent to said identifying, storing fragments from said identifying pursuant to the user group of the user.

The present invention provides a computer system comprising a processor and a computer readable memory unit coupled to the processor, said memory unit containing instructions that when executed by the processor implement a method for availing literate programming in a software development environment, the method comprising:

processing a retrieval request made by a user to present a first integrated artifact of at least one integrated artifact, wherein the user is a member of a user group consisting of a first group of commentators and a second group of developers, wherein said processing the retrieval request comprises:

retrieving a first source code fragment from a source code storage and retrieving a first design comment fragment associated with the first source code fragment from a design comment storage, wherein the first source code fragment and the first design comment fragment are associated with each other by a first tag of at least one tag;

subsequent to said retrieving, merging the first source code fragment and the first design comment fragment into the first integrated artifact;

subsequent to said merging, presenting the first integrated artifact to the user through an interface associated with the user group of the user; and processing a storage request made by the user to store a second integrated artifact of said at least one integrated artifact, wherein said processing the storage request comprises:

separating the second integrated artifact into a second source code fragment and a second design comment fragment;

subsequent to said separating, identifying the second source code fragment and the second design comment fragment by a second tag of said at least one tag;

subsequent to said identifying, storing fragments from said identifying pursuant to the user group of the user.

The present invention provides a method and system that overcomes at least one of the current disadvantages of conventional method and system for software development environment.

DETAILED DESCRIPTION OF THE INVENTION

Figure 1A:
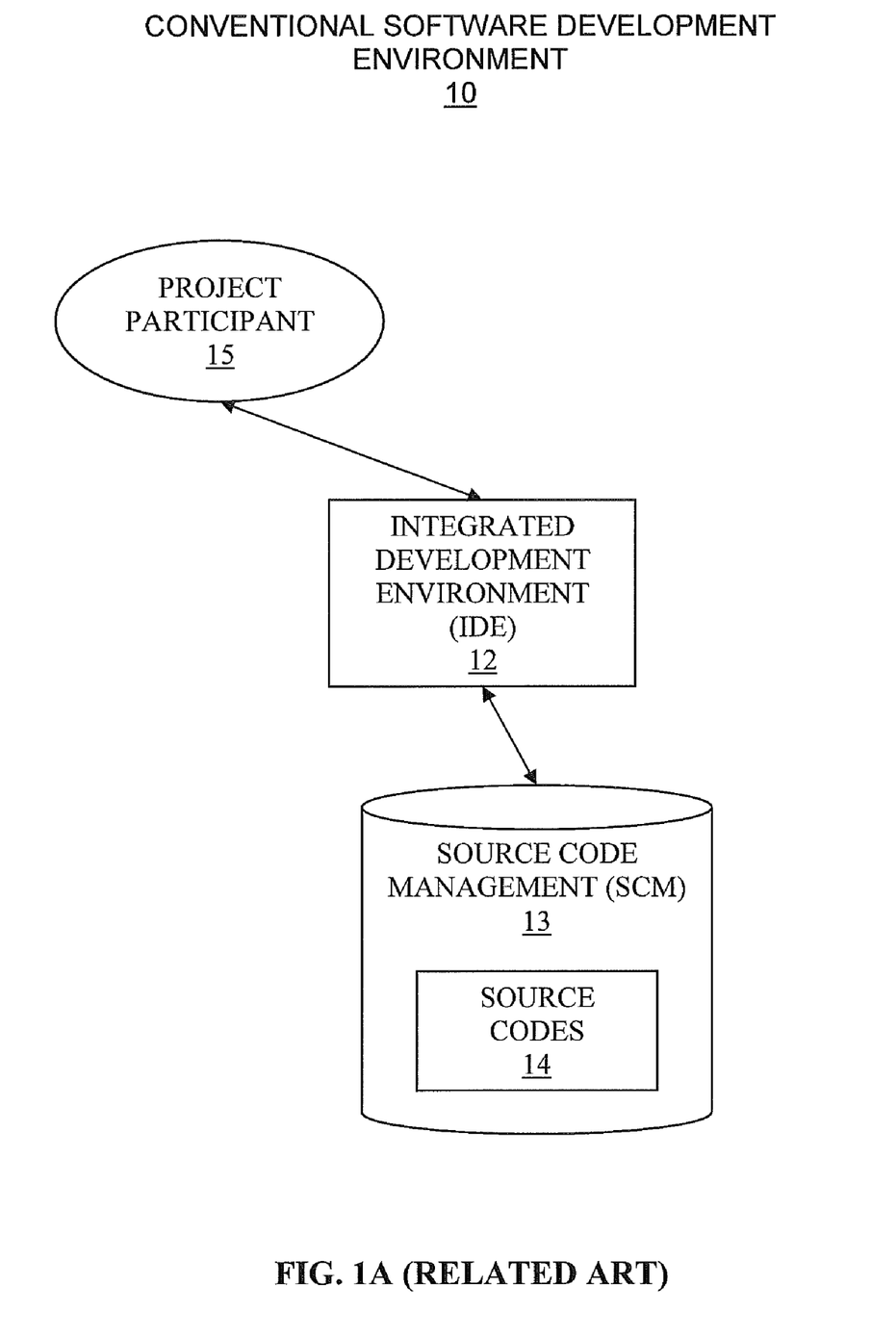
FIG. 1A illustrates a conventional software development environment.

FIG. 1A illustrates a conventional software development environment 10. The conventional software development environment 10 comprises an integrated development environment (IDE) 12 and a source code management (SCM) 13 that contains source codes 14. A typical user of the conventional software development environment 10 is a project participant 15 who works in a software development project.

The IDE 12 provides a user interface for the project participant 15 to the SCM 13 with multiple supporting tools for programming efficiency. Examples of supporting tools include, inter alia, an editor, a compiler, a simulator, etc. Functions provided by the editor of the IDE 12 may include, inter alia, syntax highlighting, code structure diagram, etc. Examples of IDEs are, inter alia, Eclipse by the Eclipse Foundation, IBM® Bookmaster®, etc.

The SCM 13 manages source code with functions of version control, concurrent coding support, source code integration, etc. Examples of conventional source code management systems may be, inter alia, a Source Code Management (SCM) software, concurrent versions system (CVS), Subversion, IBM Rational® Clearcase®, etc.

Figure 1B:
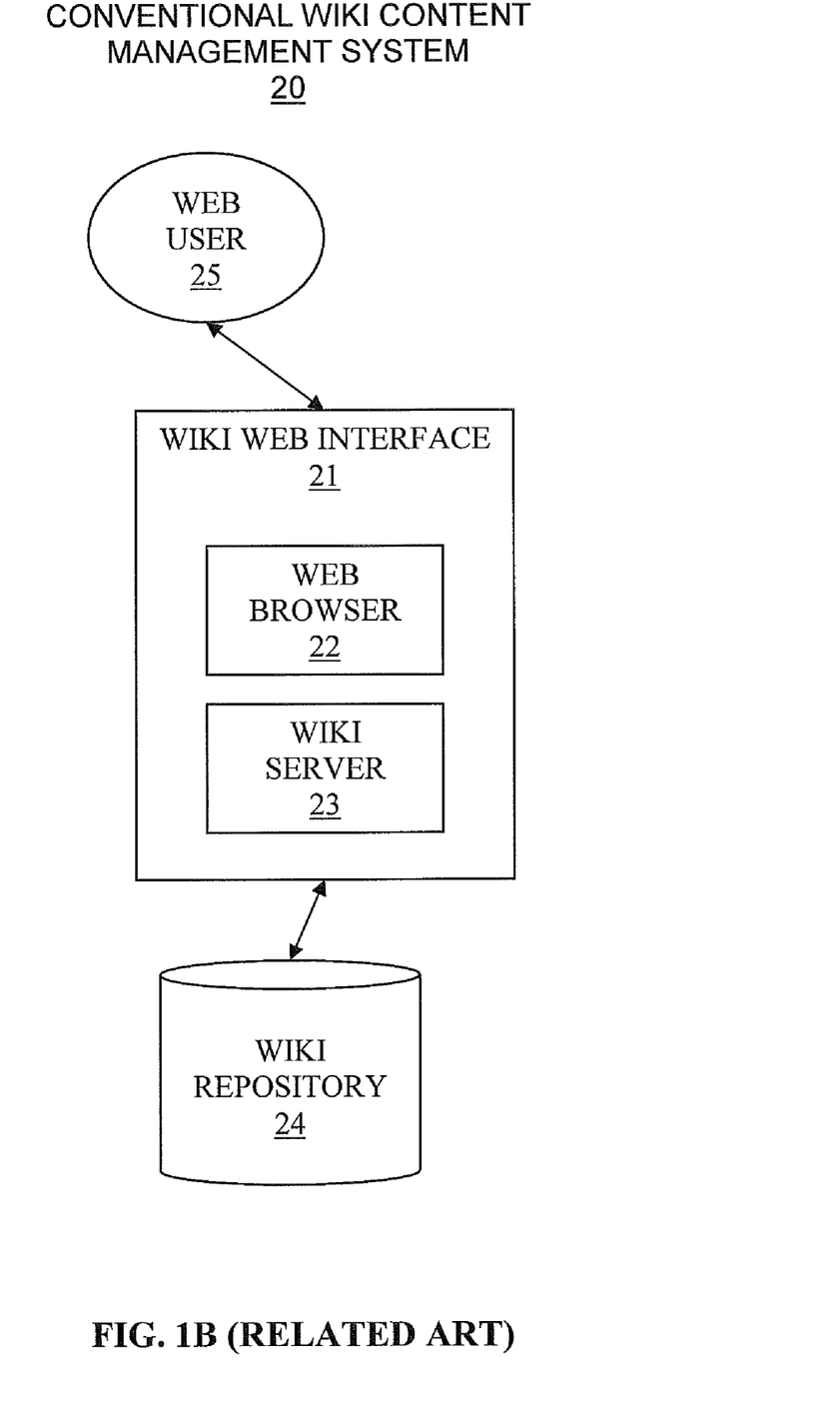
FIG. 1B illustrates a conventional wiki content management system.

FIG. 1B illustrates a conventional wiki content management system 20. The conventional wiki content management system 20 comprises a wiki interface 21 and a wiki repository 25. The wiki interface 21 comprises a web browser 22 and a wiki server 23. A wiki is a type of software that provides collaborative and dynamic creation of a web page by wide variety of web users 25 accessing via Internet, etc. Conventional wiki is characterized by a custom indexing of content, tagging, and backlinking, history logging, etc. Conventional wiki is not suitable as an environment of a software development project.

Figure 2:
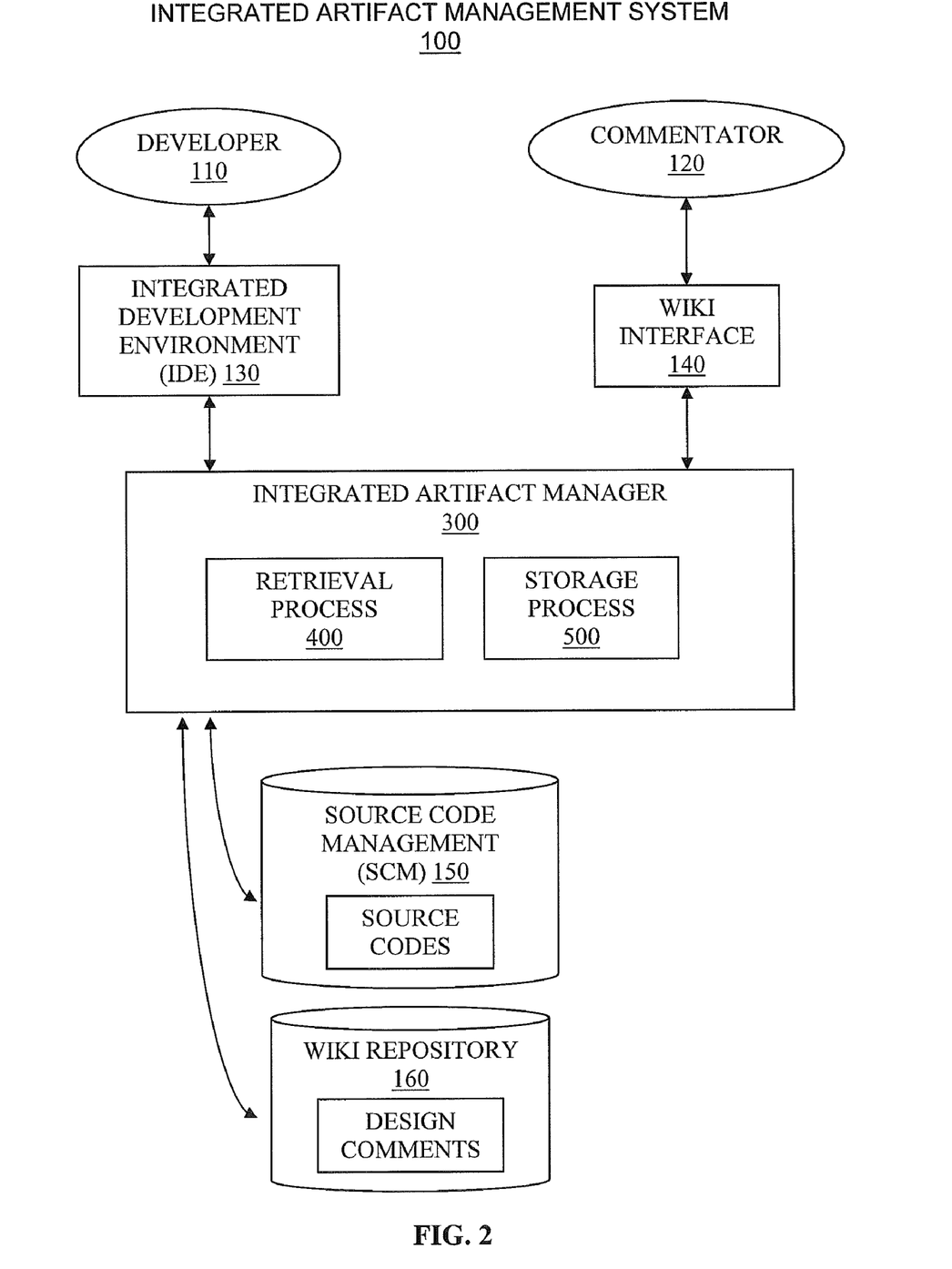
FIG. 2 illustrates an integrated artifact management system availing literate programming in a conventional software development environment, in accordance with embodiments of the present invention.

FIG. 2 illustrates an integrated artifact management system 100 availing literate programming in a conventional software development environment, in accordance with embodiments of the present invention.

The integrated artifact management system 100 comprises an integrated artifact manager 300, an integrated development environment (IDE) 130, a wiki interface 140, a source code management system (SCM) 150, and a wiki repository 160.

Literate programming is a style of a computer programming that primarily targets human readability of a program code in ordinary language, as opposed to conventional programming style focusing mainly on source code lines for a machine execution. In literate programming, human readable documentation in a natural language is combined into a single entity with source codes that are written in a programming language. Also, the single entity is structured in a way that external utilities can easily interface with the single entity. External utilities generate program documentation and/or extract source codes for subsequent processing by compiler, interpreter, etc.

The term single entity is used interchangeably with the term integrated artifact in this specification. The term documentation is used interchangeably with the term design comment, which describes the purpose of associated source codes. The integrated artifact comprises at least one fragment of source code and zero or more fragments of design comment. A fragment is delimited by a pair of tags surrounding the fragment within an integrated artifact in associating source codes and design comments. The integrated artifact keeps documentation in close proximity to source codes that the documentation describes. Fragments of the integrated artifact are organized in a way that a human reader can easily follow the logic and/or a hierarchy of the integrated artifact in understanding source codes by reading associated documentation.

Conventional source code documentation generator tools supporting features of literate programming include, inter alia, noweb, FunnelWeb and, to a lesser extent, Javadoc™, Doxygen, etc. Functionalities that conventional source code documentation generator tools support include, inter alia, an on-line documentation browser, an off-line reference manual, multiple output formats, a code structure extraction, automatic generation of visual displays on relationships among elements, normal documentation, etc. However, conventional source code documentation generator tools are more oriented toward code construction rather than human readability as in literate programming tools. Examples of large scale software products with high-complexity that is benefited from literate programming include, inter alia, IBM CICS® Transaction Server.

The method of the present invention avails literate programming in conventional environments. The method of the present invention also overcomes a problem of conventional literate programming tools that cannot be used in conjunction with any conventional SCM, document mark-up tools, and production tools, etc. Furthermore, because the method of present invention employs conventional user interfaces of the IDE and the wiki interface, users of the integrated artifact management system experience literate programming in a more familiar environment, leading to a more efficient literate programming.

Figure 4:
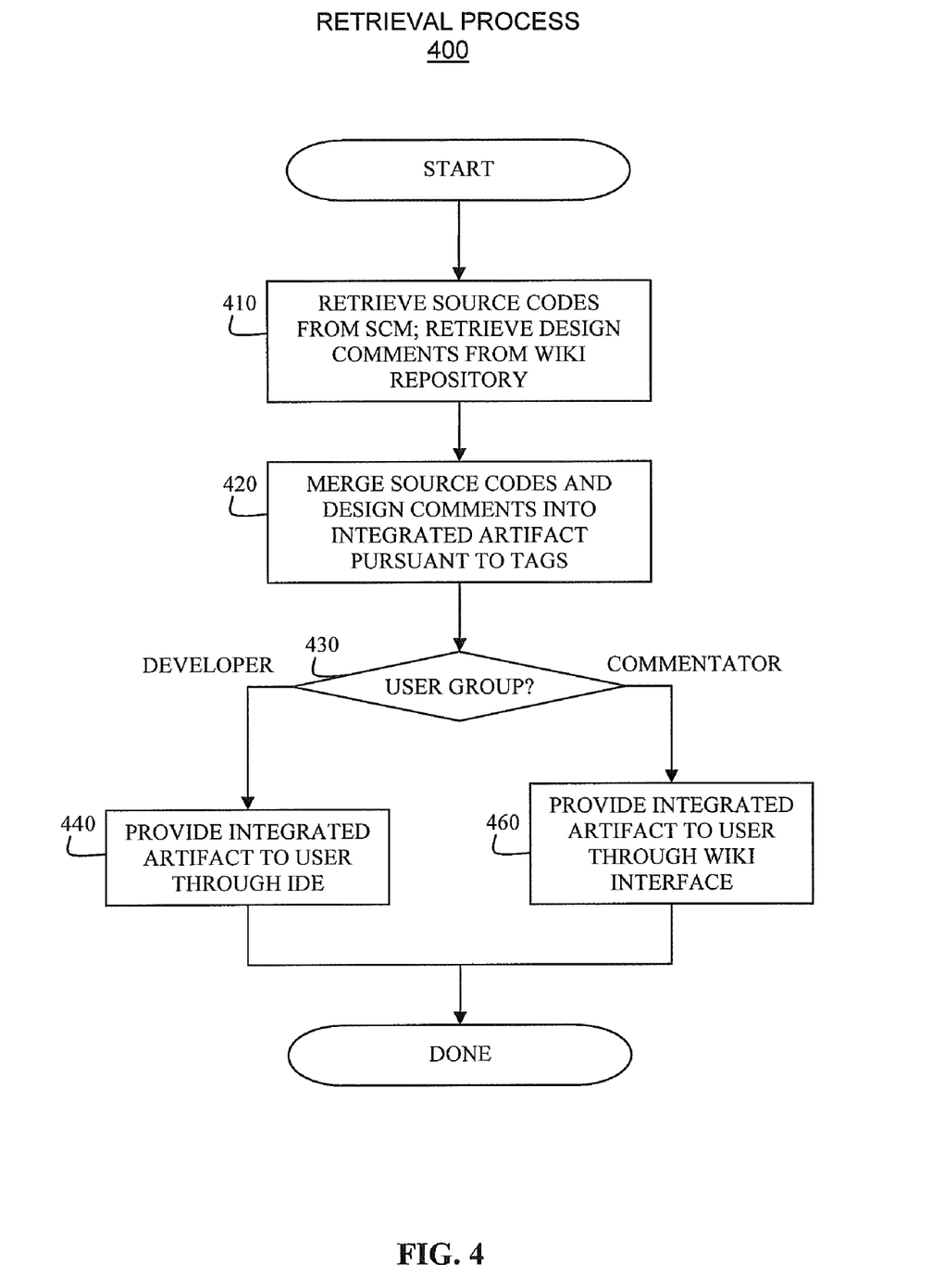
FIG. 4 is a flowchart depicting a method for an integrated artifact manager processing a retrieval request, in accordance with the embodiments of the present invention.
Figure 5:
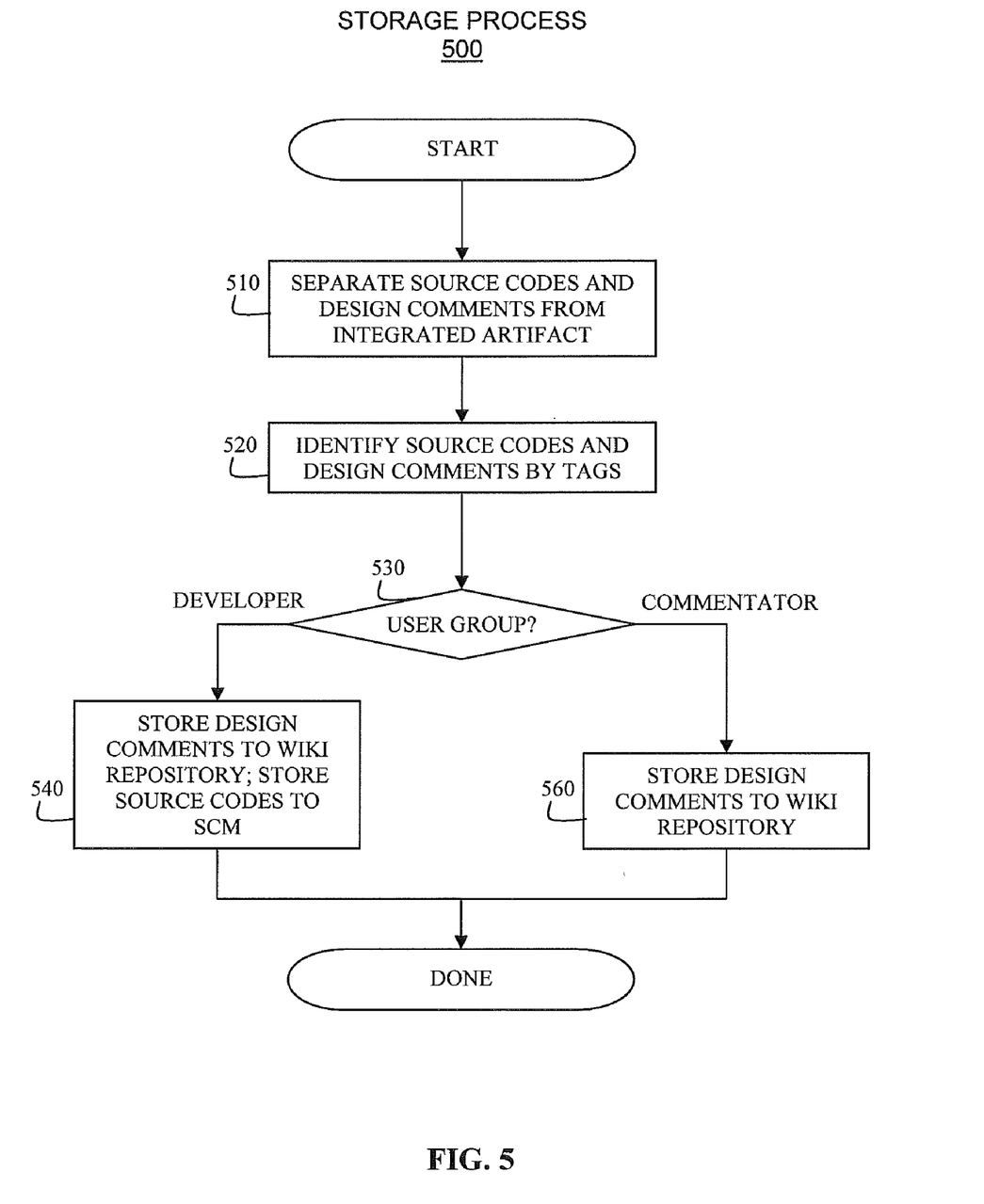
FIG. 5 is a flowchart depicting a method for an integrated artifact manager processing a storage request, in accordance with the embodiments of the present invention.

The integrated artifact manager 300 comprises a retrieval process 400 described in FIG. 4, infra, and a storage process 500 described in FIG. 5, infra. The integrated artifact manager 300 provides a literate programming functionality in the integrated artifact management system 100 that combines a conventional software development environment of FIG. 1A and a conventional wiki content management system of FIG. 1B.

A user accessing the integrated artifact management system 100 through the IDE of the conventional software development environment is identified as a developer 110, who can modify both source codes and design comments. When the developer 110 accesses the integrated artifact manager 300, the integrated artifact manager 300 operates in a developer group. A user accessing the integrated artifact management system 100 through the wiki interface of the conventional wiki content management system is identified as a commentator 120, who can modify only design comments. When the commentator 120 accesses the integrated artifact manager 300, the integrated artifact manager 300 operates in a commentator group. Source code fragments are stored in the SCM of the conventional software development environment. Design comment fragments are stored in the wiki repository of the conventional wiki content management system.

Figure 3:
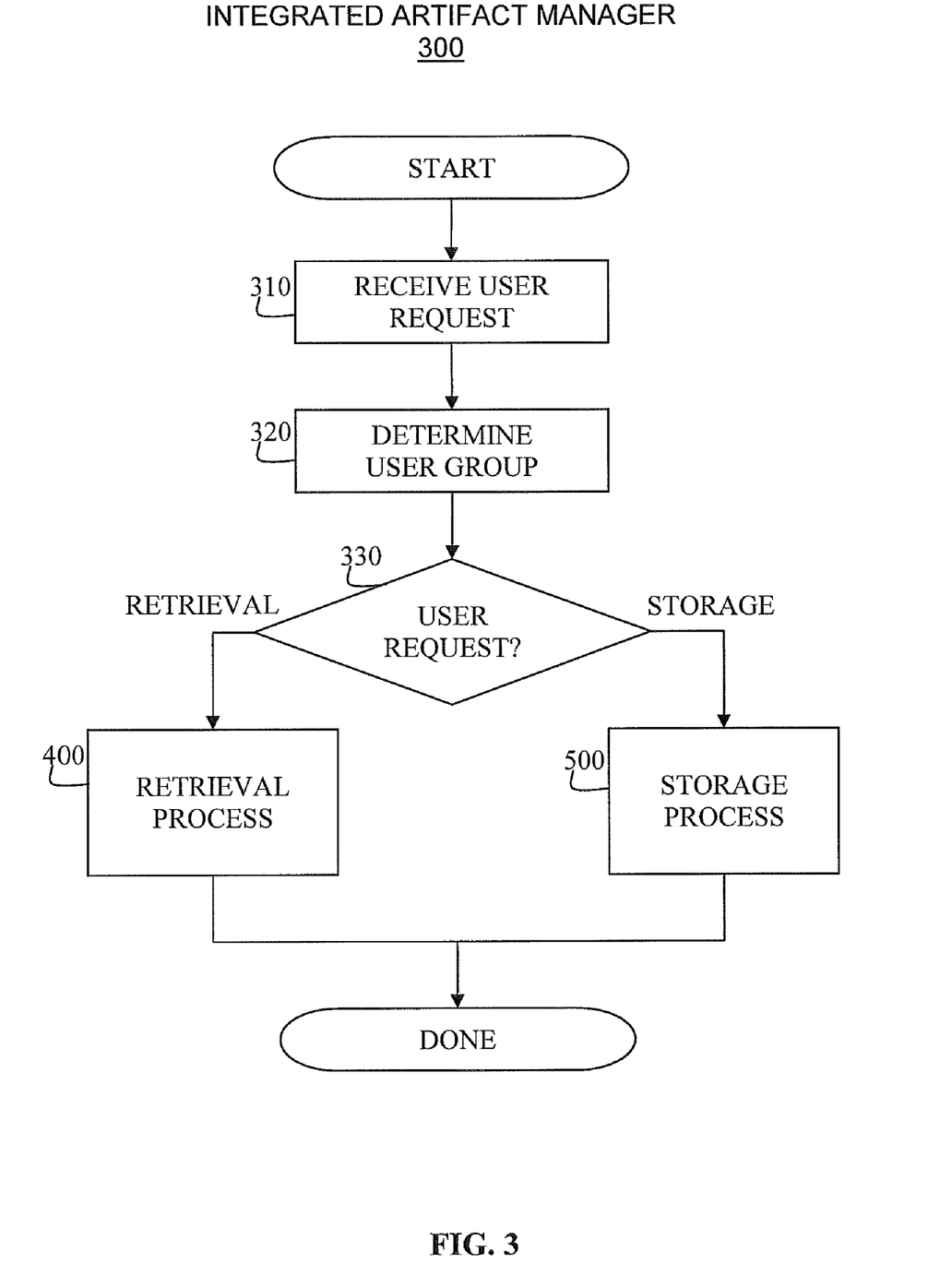
FIG. 3 is a flowchart depicting a method for an integrated artifact manager, in accordance with the embodiments of the present invention.

FIG. 3 is a flowchart depicting a method for an integrated artifact manager, in accordance with the embodiments of the present invention.

In step 310, the integrated artifact manager receives a request from a user through an interface.

In step 320, the integrated artifact manager determines a user group by examining the interface through which the request delivered. If the interface is an integrated development environment (IDE), then the integrated artifact manager determines that the user group is a developer group. If the interface is a wiki interface, then the integrated artifact manager determines that the user group is a commentator group.

In step 330, the integrated artifact manager determines a type of the request by examining arguments provided with the request, a data flow direction, etc. The request is either a retrieval request or a storage request. If the integrated artifact manager determines that the type of the request is retrieval, then the integrated artifact manager performs a retrieval process in step 400 defined in FIG. 4, infra. If the integrated artifact manager determines that the type of the request is storage, then the integrated artifact manager performs a storage process in step 500 defined in FIG. 5, infra.

FIG. 4 is a flowchart depicting a method for an integrated artifact manager processing a retrieval request, in accordance with the embodiments of the present invention.

In step 410, the integrated artifact manager extracts source code fragments from the SCM and design comment fragments from the wiki repository.

In step 420, the integrated artifact manager merges source code fragments and design comment fragments into an integrated artifact pursuant to tags associating a source code fragment with a design comment fragment.

In step 430, the integrated artifact manager branches pursuant to the user group determined in step 320 of FIG. 3, supra. If the user group is a developer group, then the integrated artifact manager proceeds with step 440. If the user group is a commentator group, then the integrated artifact manager proceeds with step 460.

In step 440, the integrated artifact manager provides the integrated artifact to the developer user through the IDE interface. The developer user continues with modifying the integrated artifact via tools supported by the IDE interface.

In step 460, the integrated artifact manager provides the integrated artifact to the commentator user through the wiki interface. The commentator user continues with browsing the integrated artifact and/or modifying design comments fragments via wiki posting forms provided by the wiki interface.

FIG. 5 is a flowchart depicting a method for an integrated artifact manager processing a storage request, in accordance with the embodiments of the present invention.

In step 510, the integrated artifact manager separates the integrated artifact into source code fragments and design comment fragments from the integrated artifact.

In step 520, the integrated artifact manager identifies source code fragments and design comment fragments by tags.

In step 530, the integrated artifact manager branches pursuant to the user group determined in step 320 of FIG. 3, supra. If the user group is a developer group, then the integrated artifact manager proceeds with step 540. If the user group is a commentator group, then the integrated artifact manager proceeds with step 560.

In step 540, the integrated artifact manager stores design comment fragments to the wiki repository and stores source code fragments to the SCM. The integrated artifact manager permits the developer user to modify both source code fragments and design comment fragments.

In step 560, the integrated artifact manager stores design comment fragments to the wiki repository as modified by the commentator user. The integrated artifact manager permits the commentator user to modify only design comment fragments.

Figure 6:
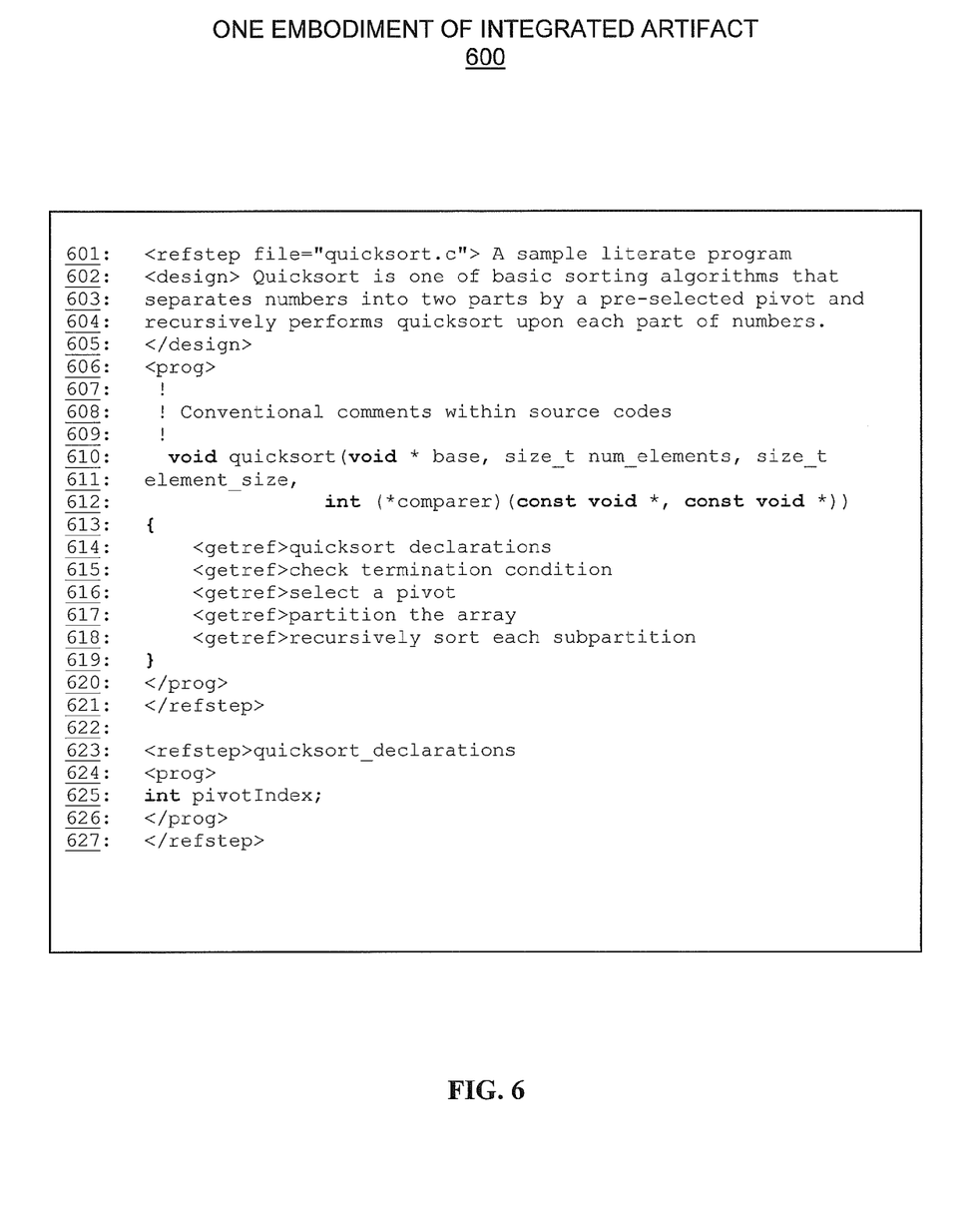
FIG. 6 illustrates an example of an integrated artifact with tags of the integrated artifact management system, in accordance with embodiments of the present invention.

FIG. 6 illustrates an example of an integrated artifact with tags of the integrated artifact management system, in accordance with embodiments of the present invention. The integrated artifact in FIG. 6 is generated in step 420 of FIG. 4, supra, or given as an input parameter to the storage process of FIG. 5, supra.

Lines 601 to 627 are an integrated artifact that is typically presented as a file in a file system. The integrated artifact comprises two fragments that are ordered to maximize readability.

A first fragment starts at a <refstep file="quicksort.c"> tag inline 601. The first fragment has a "A sample literate program" reference name. The first fragment ends at a </refstep> tag in line 621. The first fragment comprises a first design comment fragment and a first source code fragment that is described by the first design comment.

The first design comment fragment starts at a <design> tag in line 602. The first design comment fragment ends at a </design> tag in line 605. Content of first design comment fragment describes, in a readable manner, source codes of the first source code fragment following the first design comment fragment. Other tags, such as Hypertext Markup Language (HTML) tags, can be used inside design comment fragments to enrich content of design comment for a human reader.

The first source code fragment starts at a <prog> tag in line 606. The first source code fragment ends at a </prog> tag in line 620. Content of first source code fragment comprises source codes and references for other fragments. Source codes are described in a predefined programming language and are collected into a file for compilation.

From line 614 to line 618 within the first source code fragment, each <getref> tag refers to other respective fragment designated by respective reference name following each <getref> tag. A <getref> tag in line 614 followed by "quicksort_declarations" reference name refers to a fragment that starts with "<refstep>quicksort_declarations," which is shown as a second fragment in the integrated artifact. Other fragments referred by <getref> tags in lines 615 to 618 are not shown in the example. When source codes are extracted from the integrated artifact, source codes that are provided in source code fragments of respective references will replace <getref> tags and respective reference names.

A second fragment starts at a <refstep> tag in line 623 and ends at a </refstep> tag in line 627. The second fragment comprises a second source code fragment that starts at a <prog> tag in line 624 and ends at a </prog> tag in line 626. The second fragment has a "quicksort_declarations" reference name, which is referred by a <getref> tag in line 614. Because the second source code fragment is simple enough to understand for human readers without any further description (i.e., declaring one integer variable pivotIndex), no design comment fragment is provided.

Figure 7:
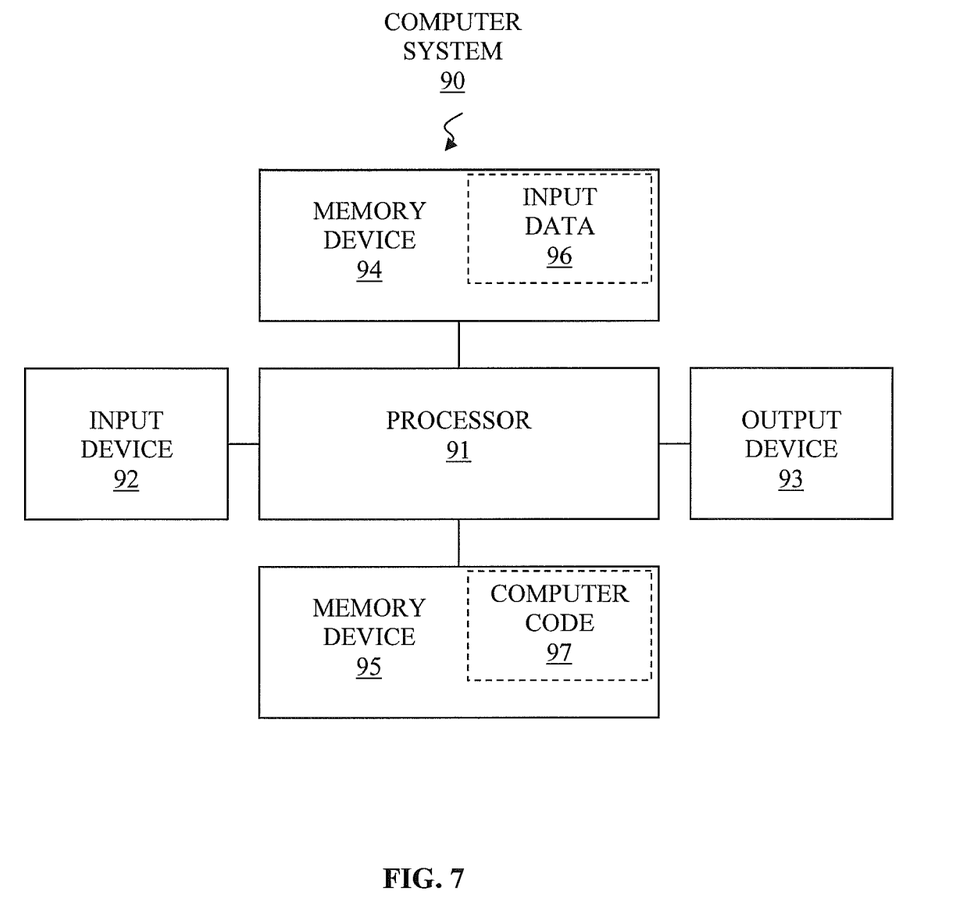
FIG. 7 illustrates a computer system used for integrated artifact management, in accordance with embodiments of the present invention.

FIG. 7 illustrates a computer system 90 used for integrated artifact management, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for integrated artifact management according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for availing literate programming in a software development environment, the method comprising:
    processing a retrieval request made by a user to present a first integrated artifact of at least one integrated artifact, wherein the user is a member of a user group consisting of a first group of commentators and a second group of developers, wherein said processing the retrieval request comprises:
        retrieving a first source code fragment from a source code storage and retrieving a first design comment fragment associated with the first source code fragment from a design comment storage, wherein the first source code fragment and the first design comment fragment are associated with each other by a first tag of at least one tag;
        subsequent to said retrieving, merging the first source code fragment and the first design comment fragment into the first integrated artifact;
        subsequent to said merging, presenting the first integrated artifact to the user through an interface associated with the user group of the user; and
    processing a storage request made by the user to store a second integrated artifact of said at least one integrated artifact, wherein said processing the storage request comprises:
        separating the second integrated artifact into a second source code fragment and a second design comment fragment;
        subsequent to said separating, identifying the second source code fragment and the second design comment fragment by a second tag of said at least one tag;
        subsequent to said identifying, storing fragments from said identifying pursuant to the user group of the user.

2. The method of claim 1, wherein the user group of the user is the second group of developers, wherein the interface associated with the second group of developers is an integrated development environment (IDE), said storing fragments comprising:
    storing the second source code fragment to the source code storage; and
    storing the second design comment fragment to the design comment storage.

3. The method of claim 1, wherein the user group of the user is the first group of commentators, wherein the interface associated with the first group of commentators is a wiki interface, said storing fragments comprising:
    storing the second design comment fragment to the design comment storage.

4. The method of claim 1, wherein the source code storage comprises a source code management system (SCM), and wherein the design comment storage comprises a wiki repository.

5. The method of claim 1, wherein said at least one tag comprises a pair of marks specifying a start and an end of a fragment in said at least one integrated artifact, wherein the fragment is selected from the group consisting of a source code fragment and zero or one design comment fragment.

6. The method of claim 1, wherein the first design comment fragment and the second design comment fragment explain the first source code fragment and the second source code fragment in a natural language, respectively.

7. The method of claim 1, wherein a design comment fragment associated with a source code fragment is null.

8. The method of claim 1, wherein a source code fragment is nested within a fragment, wherein a design comment fragment associated with the source code fragment is nested within the fragment.

9. A computer program product, comprising a computer usable storage medium having a computer readable program code embodied therein, said computer readable program code containing instructions that when executed by a processor of a computer system implement a method for availing literate programming in a software development environment, the method comprising:

processing a retrieval request made by a user to present a first integrated artifact of at least one integrated artifact, wherein the user is a member of a user group consisting of a first group of commentators and a second group of developers, wherein said processing the retrieval request comprises:

retrieving a first source code fragment from a source code storage and retrieving a first design comment fragment associated with the first source code fragment from a design comment storage, wherein the first source code fragment and the first design comment fragment are associated with each other by a first tag of at least one tag;

subsequent to said retrieving, merging the first source code fragment and the first design comment fragment into the first integrated artifact;

subsequent to said merging, presenting the first integrated artifact to the user through an interface associated with the user group of the user; and processing a storage request made by the user to store a second integrated artifact of said at least one integrated artifact, wherein said processing the storage request comprises:

separating the second integrated artifact into a second source code fragment and a second design comment fragment;

subsequent to said separating, identifying the second source code fragment and the second design comment fragment by a second tag of said at least one tag;

subsequent to said identifying, storing fragments from said identifying pursuant to the user group of the user.

10. The computer program product of claim 9, wherein the user group of the user is the second group of developers, wherein the interface associated with the second group of developers is an integrated development environment (IDE), said storing fragments comprising:

storing the second source code fragment to the source code storage; and storing the second design comment fragment to the design comment storage.

11. The computer program product of claim 9, wherein the user group of the user is the first group of commentators, wherein the interface associated with the first group of commentators is a wiki interface, said storing fragments comprising:

storing the second design comment fragment to the design comment storage.

12. The computer program product of claim 9, wherein the source code storage comprises a source code management system (SCM), and wherein the design comment storage comprises a wiki repository.

13. The computer program product of claim 9, wherein said at least one tag comprises a pair of marks specifying a start and an end of a fragment in said at least one integrated artifact, wherein the fragment is selected from the group consisting of a source code fragment and zero or one design comment fragment.

14. The computer program product of claim 9, wherein the first design comment fragment and the second design comment fragment explain the first source code fragment and the second source code fragment in a natural language, respectively.

15. A computer system comprising a processor and a computer readable memory unit coupled to the processor, said memory unit containing instructions that when executed by the processor implement a method for availing literate programming in a software development environment, the method comprising:

processing a retrieval request made by a user to present a first integrated artifact of at least one integrated artifact, wherein the user is a member of a user group consisting of a first group of commentators and a second group of developers, wherein said processing the retrieval request comprises:

retrieving a first source code fragment from a source code storage and retrieving a first design comment fragment associated with the first source code fragment from a design comment storage, wherein the first source code fragment and the first design comment fragment are associated with each other by a first tag of at least one tag;

subsequent to said retrieving, merging the first source code fragment and the first design comment fragment into the first integrated artifact;

subsequent to said merging, presenting the first integrated artifact to the user through an interface associated with the user group of the user; and processing a storage request made by the user to store a second integrated artifact of said at least one integrated artifact, wherein said processing the storage request comprises:

separating the second integrated artifact into a second source code fragment and a second design comment fragment;

subsequent to said separating, identifying the second source code fragment and the second design comment fragment by a second tag of said at least one tag;

subsequent to said identifying, storing fragments from said identifying pursuant to the user group of the user.

16. The computer system of claim 15, wherein the user group of the user is the second group of developers, wherein the interface associated with the second group of developers is an integrated development environment (IDE), said storing fragments comprising:

storing the second source code fragment to the source code storage; and storing the second design comment fragment to the design comment storage.

17. The computer system of claim 15, wherein the user group of the user is the first group of commentators, wherein the interface associated with the first group of commentators is a wiki interface, said storing fragments comprising:

storing the second design comment fragment to the design comment storage.

18. The computer system of claim 15, wherein the source code storage comprises a source code management system (SCM), and wherein the design comment storage comprises a wiki repository.

19. The computer system of claim 15, wherein said at least one tag comprises a pair of marks specifying a start and an end of a fragment in said at least one integrated artifact, wherein the fragment is selected from the group consisting of a source code fragment and zero or one design comment fragment.

20. The computer system of claim 15, wherein the first design comment fragment and the second design comment fragment explain the first source code fragment and the second source code fragment in a natural language, respectively.

* * * * *